US009869264B2

(12) United States Patent
Juhasz et al.

(10) Patent No.: US 9,869,264 B2
(45) Date of Patent: Jan. 16, 2018

(54) COMPUTER-IMPLEMENTED METHOD FOR CALCULATION AND OUTPUT OF CONTROL PULSES BY A CONTROL UNIT

(71) Applicant: dSPACE digital signal processing and control engineering GmbH, Paderborn (DE)

(72) Inventors: Laszlo Juhasz, Deggendorf (DE); Dirk Berneck, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 65 days.

(21) Appl. No.: 15/014,572

(22) Filed: Feb. 3, 2016

(65) Prior Publication Data

US 2016/0222904 A1   Aug. 4, 2016

(30) Foreign Application Priority Data

Feb. 3, 2015   (DE) .......................... 10 2015 101 513

(51) Int. Cl.
*F02D 41/26*   (2006.01)
*F02D 41/30*   (2006.01)
(Continued)

(52) U.S. Cl.
CPC ........... *F02D 41/26* (2013.01); *F02D 41/266* (2013.01); *F02D 41/34* (2013.01);
(Continued)

(58) Field of Classification Search
CPC ...... F02D 41/009; F02D 41/26; F02D 41/266; F02D 41/34; F02D 37/02; F02D 2250/12;
(Continued)

(56) References Cited

U.S. PATENT DOCUMENTS

2004/0244777 A1* 12/2004 Miyamoto .......... F02D 41/3005
                                                       123/478
2006/0004510 A1*  1/2006 Sheikh ................ F02D 41/009
                                                       701/103

(Continued)

OTHER PUBLICATIONS

"Specification of Injection and Ignition Pulse Pattern", pp. 1-3 (2006).

(Continued)

*Primary Examiner* — John Kwon
*Assistant Examiner* — Johnny H Hoang
(74) *Attorney, Agent, or Firm* — Muncy, Geissler, Olds & Lowe, P.C.

(57) ABSTRACT

A computer-implemented method for calculation and output of control pulses by a control unit having a first computing unit and a second computing unit, wherein the control pulses are output by the control unit to an internal combustion engine. The calculation of the control pulses is optimized in that the first computing unit calculates a control pulse pattern with triggering information for multiple future control pulses at a first sampling rate using prior state data of the engine, and transmits the calculated control pulse pattern to the second computing unit, that the second computing unit at a second sampling rate that is greater than the first sampling rate of the first computing unit corrects the triggering information of the control pulses that are currently to be output using current state data of the engine, and that control pulses are output to the engine based on the corrected triggering information.

9 Claims, 5 Drawing Sheets

(51) Int. Cl.
*F02D 41/34* (2006.01)
*G05B 19/042* (2006.01)
*F02D 37/02* (2006.01)
*F02D 41/00* (2006.01)

(52) U.S. Cl.
CPC .......... *G05B 19/0421* (2013.01); *F02D 37/02* (2013.01); *F02D 41/009* (2013.01); *F02D 2250/12* (2013.01); *G05B 2219/25229* (2013.01); *Y02T 10/44* (2013.01)

(58) Field of Classification Search
CPC ...... G05B 19/0421; G05B 2219/25229; Y02T 10/44
USPC .......................... 701/103–105; 123/478–481
See application file for complete search history.

(56) References Cited

U.S. PATENT DOCUMENTS

| | | | | |
|---|---|---|---|---|
| 2006/0137661 | A1* | 6/2006 | Hayakawa | F02D 41/20 123/499 |
| 2007/0017485 | A1* | 1/2007 | Nakane | F02D 41/3845 123/457 |
| 2007/0088883 | A1* | 4/2007 | Wakabayashi | B60W 50/06 710/110 |
| 2008/0087255 | A1* | 4/2008 | Aoyama | F02D 13/023 123/48 B |
| 2008/0302334 | A1* | 12/2008 | Kotou | F02D 41/008 123/457 |
| 2011/0137541 | A1* | 6/2011 | Malikopoulos | F02D 41/1406 701/106 |
| 2013/0139791 | A1* | 6/2013 | Kusakabe | F02D 41/20 123/478 |
| 2013/0173139 | A1* | 7/2013 | Yoshikawa | F02D 41/062 701/103 |

OTHER PUBLICATIONS

"PROtroniC BaseLINE," Article-No. 1011210, Schaeffler Engineering GmbH, pp. 1-4 (Aug. 18, 2014).

PROtroniC Line, "The All-Rounder for Rapid Control Prototyping," Schaeffler Engineering GmbH, pp. 1-8 (Jun. 2015).

Donghoon Lee, "Closed-Loop Combustion Control of Advanced Internal Combustion Engines," pp. 1-142 (2011).

"Electronic Fuel injection control with FPGA", at http://c128.com/, pp. 1-3 (Nov. 13, 2014).

Guillemin et al., "Prototyping and Deployment of Real-Time Signal Processing Algorithms for Engine Control and Diagnosis," Signal Processing, Automation and Control department, pp. 1-32 (Jun. 3, 2008).

* cited by examiner

COMPUTER-IMPLEMENTED METHOD FOR CALCULATION AND OUTPUT OF CONTROL PULSES BY A CONTROL UNIT

This nonprovisional application claims priority under 35 U.S.C. §119(a) to German Patent Application No. 10 2015 101 513.7, which was filed in Germany on Feb. 3, 2015, and which is herein incorporated by reference.

BACKGROUND OF THE INVENTION

Field of the Invention

The invention relates to a computer-implemented method for calculation and output of control pulses by a control unit, wherein the control unit has a first computing unit and a second computing unit, and wherein the control pulses are output by the control unit to an internal combustion engine. Moreover, the invention also relates to a control unit in this connection for calculation and output of control pulses to an internal combustion engine, wherein the control unit has a first computing unit and a second computing unit.

Description of the Background Art

Methods for calculation and output of control pulses by a control unit have been known ever since control units, in the form of engine control units for example, have been implemented on the basis of electronic computing units. These computing units are fundamentally programmable, whether through the programming of a processor-based computing unit or through the programming of a programmable logic element, for example in the form of an FPGA, or through the "programming" of a hardware unit through a hardware description.

The control pulses calculated and output to an internal combustion engine by the control unit can be of a wide variety of types. Typically, these are pulses for controlling the fuel injection (in gasoline and diesel engines, for example) and pulses for controlling the fuel ignition (for example in gasoline engines). However, the control units can also issue other control pulses, for example for controlling the throttle valve or for emissions control (lambda control).

In order to calculate the control pulses, the control unit normally processes a variety of sensor data, for example information about the position of the crankshaft and camshaft, the air mass flow, the air mass temperature, the position of the throttle valve, and other sensor data.

Internal combustion engines are highly dynamic systems in operation, with rapid state changes, and require very fast closed-loop control systems. These closed-loop control systems are implemented on and with the computing units of the control unit, where the computing units are—in any case additionally—real-time control systems. The hardware implementation of control units always requires resolving the conflict between the most powerful, fastest hardware and the need for strict control of costs; by its nature, this is a tradeoff.

It is possible that the sampling rates achievable with the computing units of the control unit will not permit open-loop and/or closed-loop control algorithms to be executed sufficiently rapidly that each control pulse can be calculated anew with sensor data and/or state data updated in each sampling step. In this case a plurality of control pulses is calculated based on prior state data and is successively output by the control unit to the internal combustion engine, implementing a type of feed-forward control. In contrast, if it is essential to always be able to achieve sufficiently high sampling rates to calculate every single control pulse anew using current state data, extremely high cost increases must be accepted in the implementation of the control units due to the use of very powerful hardware components.

SUMMARY OF THE INVENTION

It is therefore an object of the present invention to provide a method for calculation and output of control pulses by a control unit with which the calculation and output of control pulses can be optimized in time, preferably with moderate hardware expense.

In an exemplary embodiment, the first computing unit calculates a control pulse pattern with triggering information for multiple future control pulses at a first sampling rate using prior state data of the engine and transmits the calculated control pulse pattern to the second computing unit, that the second computing unit, at a second sampling rate that is greater than the first sampling rate of the first computing unit, corrects the triggering information of the control pulses that are currently to be output using current state data of the engine, and that control pulses are output to the engine by the control unit on the basis of the corrected triggering information.

The control pulse patterns calculated by the first computing unit on the basis of prior state data of the engine thus represent a description for control pulses to be generated in the future. The triggering information contained in the control pulse pattern for each future control pulse is a suitable description of the consecutive future control pulses, wherein the triggering information can be specified in units of the engine angle, the crankshaft angle, and here, for example, relative to the top dead center of each cylinder or in—relative—time units, for example.

The triggering information for future control pulses calculated by the first computing unit on the basis of prior state data can comprise, for example, a full engine cycle, which is to say, for example, triggering information for the fuel injection and for the ignition of the injected fuel. This triggering information is then consistent, as a rule, if it is based on the same prior state data of the engine. This calculation of the control pulse pattern containing multiple items of triggering information for multiple future control pulses is by its nature a feed-forward control, since the system no longer reacts to state variables of the internal combustion engine that change in the meantime.

However, on the second computing unit, which is operated at a sampling rate that is greater than the sampling rate of the first computing unit, a correction of the triggering information initially calculated by the first computing unit is possible on the basis of current state data of the engine. The second computing unit thus implements a readjustment. The distribution according to an embodiment of the invention of the calculation and correction of triggering information among a first, slow computing unit and a second, faster computing unit permits rapid reaction to sudden state changes of the internal combustion engine, for example in the form of a speed change within one of the control pulse patterns calculated by the first computing unit. Nevertheless, it is not necessary for all calculations to be performed on just one computing unit that is very fast on the whole, but instead it is possible to decide which calculations are performed on the first computing unit for feed-forward control and which calculations are performed on the second computing unit on the basis of completely current state data for readjustment. This creates the opportunity to configure the computing units of the control unit such that computing power is optimally utilized, thus making possible a configuration of the hardware equipment of the control unit that is optimal from a cost viewpoint as well.

In an embodiment of the method according to the invention, provision is made for the second computing unit to check whether a control pulse having corrected triggering information conflicts with a subsequent control pulse. The second computing unit calculates, at the second sampling rate that is greater than the first sampling rate of the first computing unit, corrected triggering information for the triggering information received from the first computing unit. On the basis of the correction, it can happen that the corrected triggering information causes a time delay, which is to say that the associated control pulse should, for instance, be issued later than was scheduled according to the triggering information in the control pulse pattern of the first computing unit. This delayed control pulse may end up very close in time to the triggering time of the next control pulse whose triggering information was still calculated by the first computing unit and has not yet been corrected. It is then undesirable, for example, to generate injection and/or ignition pulses that follow one another closely in time and are "conflicting" in this regard. Such control pulse conflicts can be detected, for example, by the circumstance that the triggering intervals defined by triggering information of consecutive control pulses overlap.

In an embodiment of the method, provision is made that control pulses having conflicting triggering information are combined into a single control pulse with averaged triggering information, or—alternatively—all but one of the conflicting control pulses are discarded.

In an embodiment of the method, the second computing unit can use the current crankshaft angle, and/or a time derivative of the current crankshaft angle, and/or a current cylinder pressure, and/or a time derivative of the cylinder pressure, as current state data of the engine. These state data can change very quickly, and are of considerable importance for the correction of triggering information for control pulses that have been calculated by the first computing unit. In this regard, it is useful to acquire at least these state data with the second computing unit, which operates with a higher sampling rate than the first computing unit. A readjustment in the calculation and output of control pulses can be implemented very effectively in this way. As a result, it becomes possible in this way to implement open-loop engine control or closed-loop engine control that allows a reaction to changing state variables of the engine within one engine cycle, for example.

In an embodiment of the method, the first computing unit can use the last known crankshaft angle—often simply referred to as the crank angle—and/or the last known value for the air mass flow, and/or the last known value for the injected fuel quantity, and/or the last known value for the combustion air ratio, and/or a time derivative of the aforementioned variables, as prior state data of the engine. Aside from the crankshaft angle, these state variables are variables that generally are less highly dynamic and thus do not necessarily have to be acquired by the second computing unit, so it is possible to reduce the load on the second computing unit here. In particular, the combustion air ratio measured via the lambda probe is ascertained only at relatively long time intervals. The last known values can also be estimated values; this is frequently the case for the injected fuel quantity, for example.

In implementing the above-described method, it has proven to be especially advantageous when the first computing unit is implemented using at least one processor or microcontroller and when the second computing unit is implemented using at least one programmable logic element, in particular using a Field Programmable Gate Array (FPGA). Processors and microcontrollers are sequentially operating programmable computing units with which even floating-point operations can be carried out easily, but the achievable sampling rates tend to be low, at least for processors that are typically used in control units. In contrast, programmable logic elements as "hard-wired" logic also allow the parallel processing of calculations, so considerably faster sampling rates are achievable here, even sampling rates significantly below the microsecond range, for example in the range of nanoseconds. At this time resolution, it is possible to obtain rapidly changing information about the cylinder pressure and process it further, for example.

An advantage of the method according to the invention is provided according to another embodiment in that the first computing unit calculates the control pulse pattern that is calculated with prior state data without time limitations, so that even overlapping control pulse patterns are generated and transmitted to the second computing unit. The second computing unit then uses the most current control pulse pattern received in each case. The first computing unit can thus be operated asynchronously from the second computing unit. For example, it can start the calculation of a control pulse pattern even when certain state variables have changed beyond a certain degree. Due to these recalculations of control pulse patterns that are also triggered by external influences or by specific internal events, newly calculated control pulse patterns can be provided to the second computing unit at varying intervals, which is to say that no fixed coupling in time is necessary between the calculations on the first computing unit and those on the second computing unit.

The object derived above is attained in the control unit described at the outset for calculation and output of control pulses to an internal combustion engine, wherein the control unit has a first computing unit and a second computing unit, by the means that in the operating state of the control unit the first computing unit calculates a control pulse pattern with triggering information for multiple future control pulses at a first sampling rate using prior state data of the engine and transmits the calculated control pulse pattern to the second computing unit, that in the operating state of the control unit the second computing unit, at a second sampling rate that is greater than the first sampling rate of the first computing unit, corrects the triggering information of the control pulses that are currently to be output using current state data of the engine, and that control pulses are output to the engine by the control unit on the basis of the corrected triggering information.

The first computing unit and the second computing unit can be configured by programming such that in the operating state of the control unit they carry out the method described above in detail for calculation and output of control pulses. It is especially advantageous for the first computing unit to be implemented as a processor or microcontroller and for the second computing unit to be implemented as a programmable logic element, in particular as a Field Programmable Gate Array (FPGA).

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
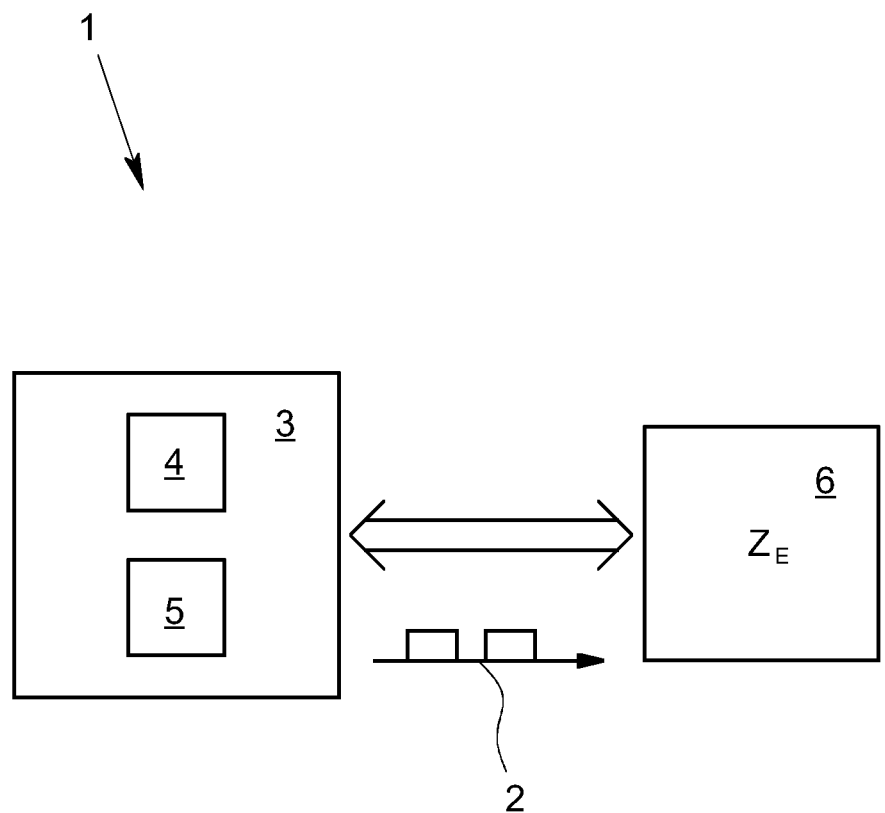
FIG. 1 schematically shows a known method for calculation and output of control pulses by a control unit to an internal combustion engine as well as a corresponding control unit, FIG. 2 schematically shows a method according to an exemplary embodiment of the invention for calculation and output of control pulses as well as a control unit according to the invention.

Shown in FIG. 1 is a known computer-implemented method 1 for calculation and output of control pulses 2 by a control unit 3, and a commensurate control unit 3, wherein the control unit 3 has a first computing unit 4 and a second computing unit 5, and wherein the control pulses 2 are output by the control unit 3 to an internal combustion engine 6.

In the exemplary embodiment shown, the control unit 3 is an engine control unit with an I/O interface that is not shown in detail and through which the control unit 3 not only outputs signals to influence the internal combustion engine 6—and if applicable other components of a vehicle—but also reads in signals to obtain information about the process to be influenced. The signals may be analog voltages, switching signals, signal patterns (for example, pulse-width modulated signals), or even complex binary data in the form of messages in the protocol of a bus communication. The state data $Z_E$ of the engine 6, in particular, are of interest for the engine control shown. Typical state data $Z_E$ of the internal combustion engine 6 include the crankshaft angle, the air mass flow, the injected fuel quantity, the combustion air ratio, the pedal position, etc.

The first computing unit 4 and the second computing unit 5 of the control unit 3 in FIG. 1 are microcontrollers, each of which is equipped with a real-time operating system. The details of which calculations are performed on the first computing unit 4 and which are performed on the second computing unit 5 are of no interest here. The state variables $Z_E$ of the internal combustion engine 6 have very different dynamics, in part because the state variables change at very different speeds due to prevailing physical conditions, but in part also because different state variables are sensed at very different sampling intervals, which is to say at different sampling rates. Thus, for example, the cylinder pressure—if it is in fact being acquired—is a state variable that changes extremely rapidly, and whose time resolution requires sampling in the range of less than a microsecond, whereas the combustion air ratio is only updated at significantly longer time intervals. The differences over which different state variables $Z_E$ of an internal combustion engine can vary over time can easily extend to more than three powers of ten; from a system theory perspective, an internal combustion engine is a very stiff system.

In the prior art, it is customary for multiple control pulses to be calculated by way of a feed-forward control, for example for a complete engine cycle, and then, once determined, to be output to the internal combustion engine 6 without taking into consideration a speed that may have already changed during the engine cycle—or any other state variable that may have changed in the meantime.

This problem can be addressed using the method 1 for calculation and output of control pulses 2 illustrated in FIGS. 2 to 5.

Figure 2:
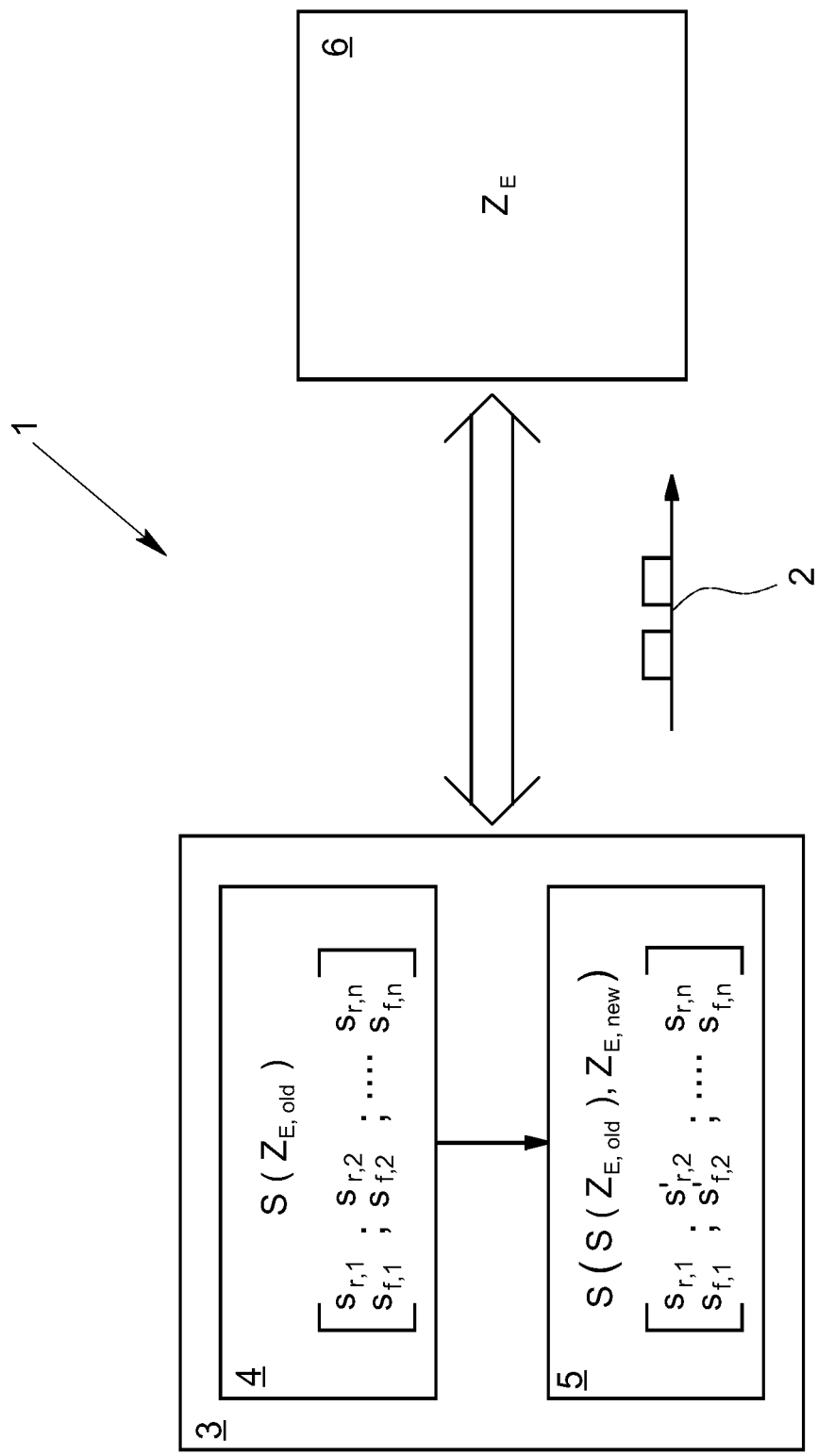

The method 1 for calculation and output of control pulses 2 shown in FIG. 2 is distinguished in that the first computing unit 4 calculates a control pulse pattern S with triggering information $s_r$, $s_f$ for multiple future control pulses at a first sampling rate using prior state data $Z_{E,old}$ of the engine 6 and transmits the calculated control pulse pattern S to the second computing unit 5. The control pulse pattern S is again represented in the first computing unit 4 with a vector of triggering information $s_r$, $s_f$, where this vector contains n items of triggering information $s_r$, $s_f$. In the present case, the items of triggering information $s_r$, $s_f$ are the starting angle and the ending angle of an ignition pulse. The control pulse pattern S calculated in the first computing unit 4 is based entirely on prior state data $Z_{E,old}$ of the engine 6. The control pulse pattern S can thus be considered consistent with regard to the underlying data base of prior state data $Z_{E,old}$. The second computing unit 5 receives the control pulse pattern S in full.

In addition, provision is made that the second computing unit 5, at a second sampling rate that is greater than the first sampling rate of the first computing unit 4, corrects the triggering information $s_r$, $s_f$ of the control pulses 2 that are currently to be output using current state data $Z_{E,new}$ of the engine 6. The second computing unit 5 is thus capable of performing the corrections at a faster speed and acquiring current state data $Z_{E,new}$ of the engine 6 [faster] than is possible for the first computing unit 4. This measure makes it possible to react to state changes of the engine 6, namely within the time range that is covered by the control pulse pattern S calculated by the first computing unit 4. The second computing unit 5 can thus adjust each individual future control pulse to new state data $Z_{E,new}$ of the engine 6, thus resulting in corrected triggering information $s_r'$, $s_f'$. Lastly, control pulses 2 are output to the engine 6 by the control unit 3 on the basis of the corrected triggering information $s_r'$, $s_f'$.

Figure 3:
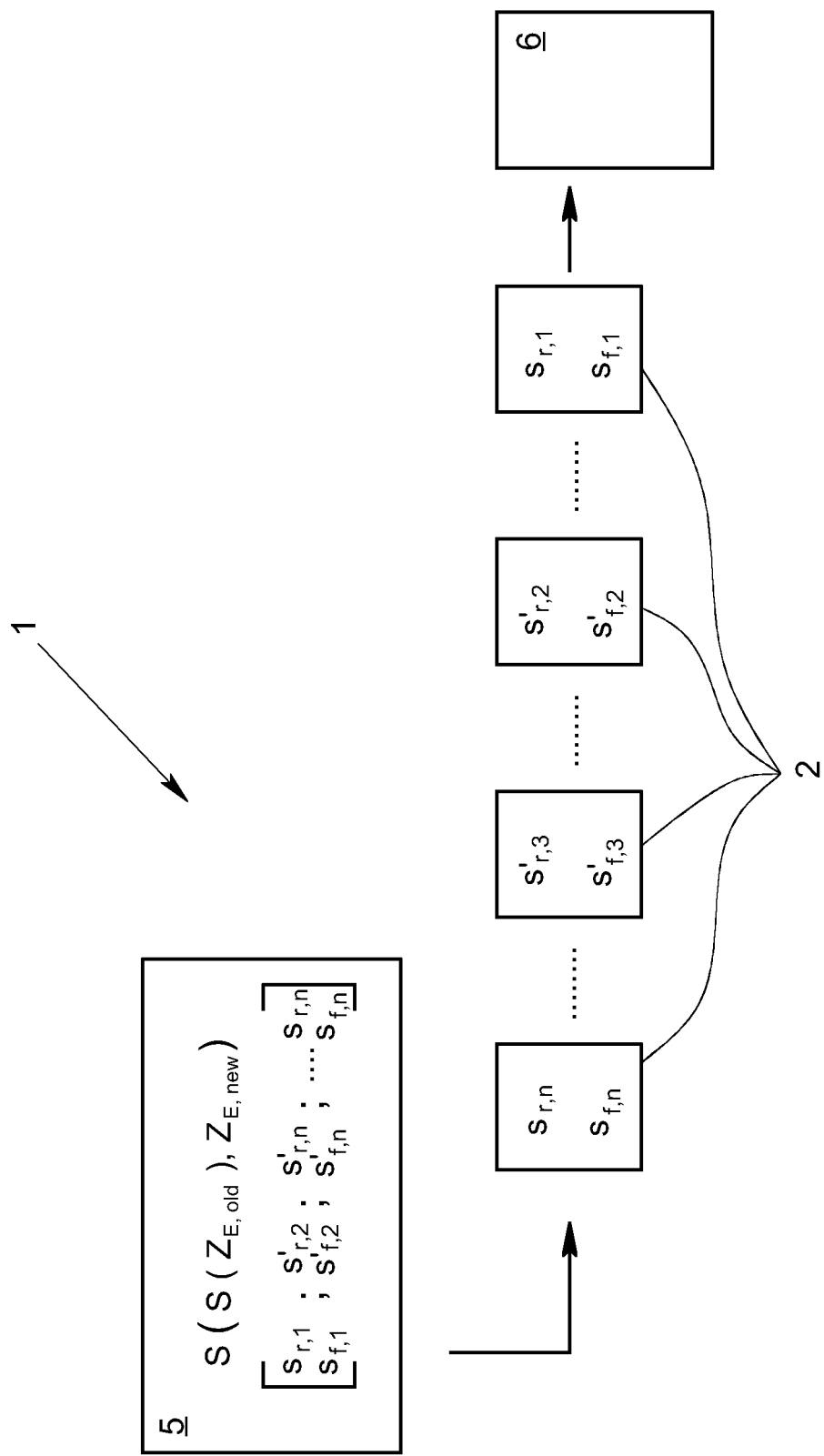
FIG. 3 shows the sequential calculation and output of control pulses by the second computing unit of the control unit.
Figure 4:
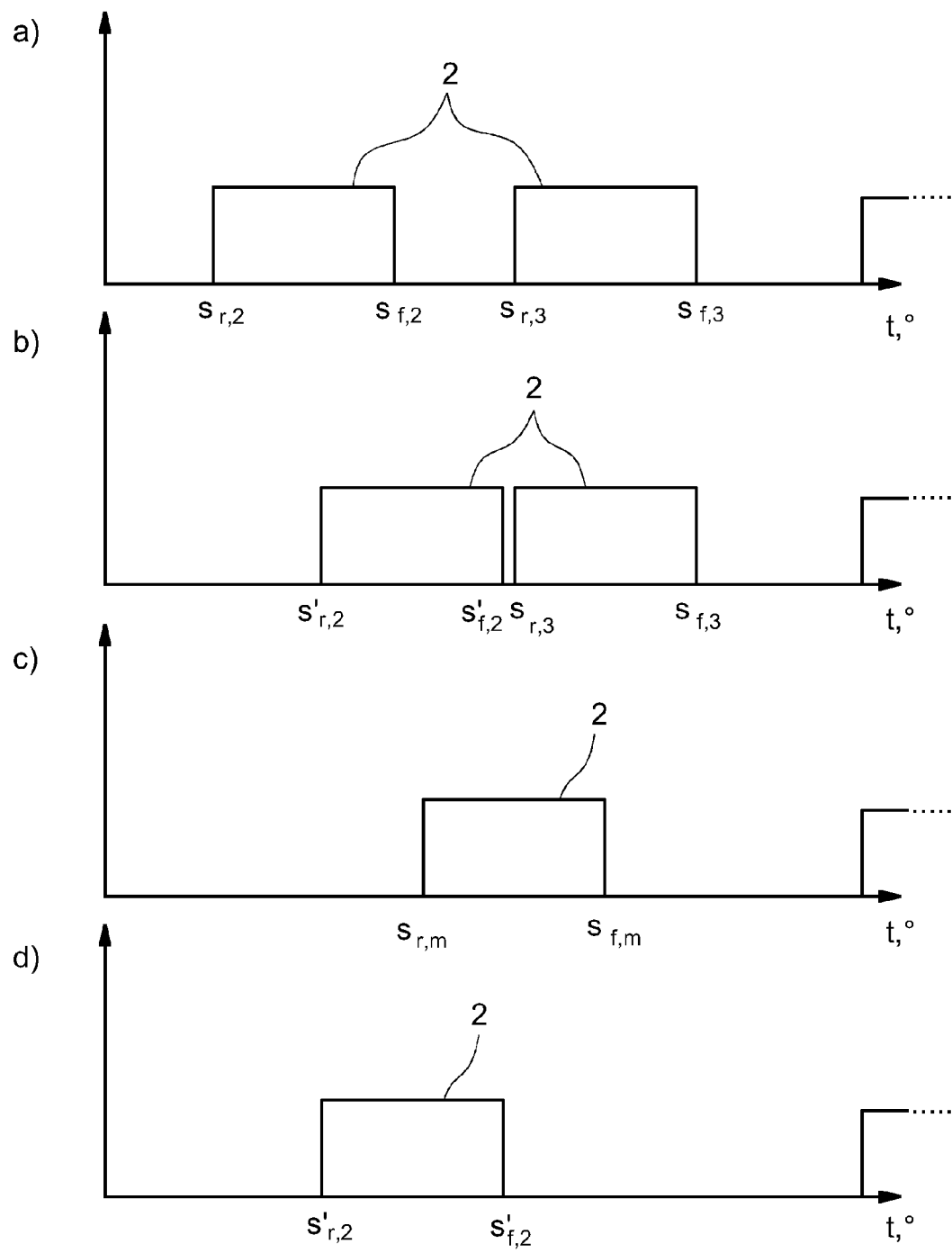
FIG. 4 shows conflicting control pulses and strategies for conflict resolution.

FIG. 3 illustrates this process once again. It is particularly clear from FIG. 3 that the second computing unit 5 calculates corrected triggering information $s_r'$, $s_f'$, sequentially and outputs it as control pulses 2 to the engine 6, while the computing unit 5 receives the control pulse pattern S more or less as an information packet—all at once.

The control unit 3 shown in FIG. 2 is configured such that the second computing unit 5 checks whether a control pulse 2 having corrected triggering information $s_r'$, $s_f'$ conflicts with a subsequent control pulse 2. For the purpose of illustrating a potential conflict of control pulses 2 that could occur, FIG. 4a first shows two control pulses 2 with the triggering information $s_{r,2}$, $s_{f,2}'$, $s_{r,3}$, $s_{f,3}$. The triggering information in FIG. 4a was calculated by the first computing unit 4, and defines the two triggering intervals shown. These triggering intervals of the control pulses 2 are considered sufficiently far apart from one another; what is involved here is triggering information $s_r$, $s_f$ of a control pulse pattern S.

FIG. 4b shows the situation after a correction of the triggering information $s_{r,2}$, $s_{f,2}$, to the corrected triggering information $s_{r,2}'$, $s_{f,2}'$. The corrected control pulse 2 here is very closely approaching the subsequent control pulse 2 that was calculated from the feed-forward control with the triggering information $s_{r,3}$, $s_{f,3}$. In the present case, the distance between the two control pulses 2 in FIG. 4b is detected as conflicting, for example because a minimum spacing for control pulses 2 is predefined, and this limit is violated here.

FIGS. 4c and 4d illustrate two possible ways for the control unit 3 or the computing unit 5 of the control unit 3 to handle such a conflict. In the case of FIG. 4c, the situation is resolved by the means that the control pulses 2 having conflicting triggering information $s_{r,2}'$, $s_{f,2}'$ and $s_{r,3}$, $s_{f,3}$ are combined into a single control pulse 2 with averaged triggering information $S_{r,m}$, $s_{f,m}$.

The solution shown in FIG. 4d alternatively provides that all but one of the conflicting control pulses 2 are discarded, in the present case the control pulse 2 with the triggering information $s_{r,2}'$, $s_{f,2}'$, is retained, while the control pulse 2 with the triggering information $s_{r,3}$, $s_{f,3}$ is discarded.

Figure 5:
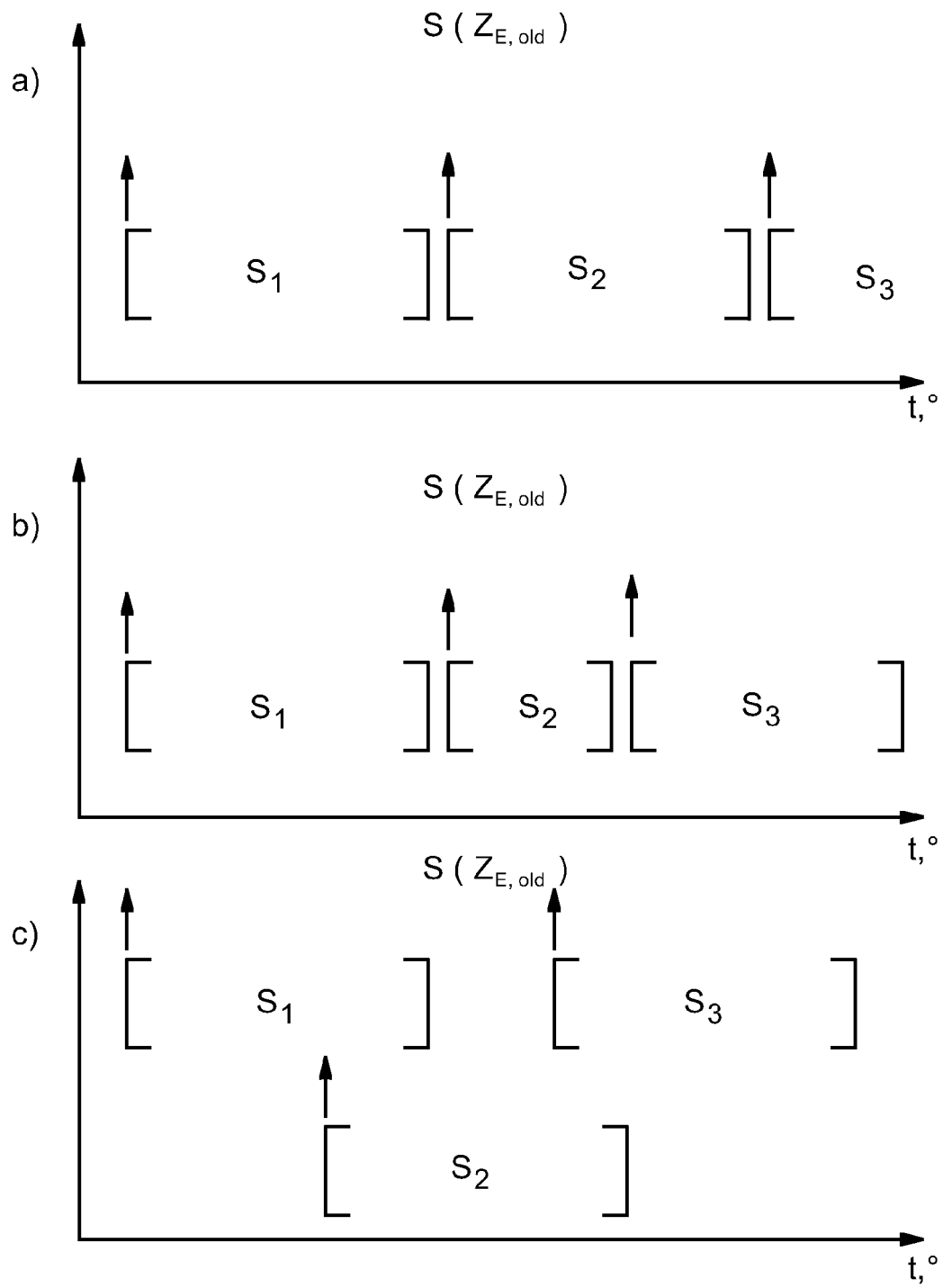
FIG. 5 shows different variants of the calculation of control pulse patterns on the first computing unit to illustrate the asynchronous performance of calculations on the first computing unit and the second computing unit.

Finally, FIG. 5 shows that the first computing unit 4 calculates the control pulse patterns S that are calculated with the prior state data $Z_{E,old}$ with no time limitations, so that even overlapping control pulse patterns S are generated and transmitted to the second computing unit 5, wherein the second computing unit 5 in the present case uses the most current control pulse pattern S received, which is to say uses it in particular for the correction. Shown in FIG. 5a, firstly, are two control pulse patterns $S_1$, $S_2$ of equal length. The time extent of the triggering information that is contained in the control pulse patterns $S_1$, $S_2$ but not shown in detail is illustrated by the width of the associated brackets in each case. The vertical arrows on the opening brackets indicate the point in time when the relevant control pulse pattern S must be fully transmitted from the first computing unit 4 to the second computing unit 5. It is obvious that the control pulse patterns S must be available to the second computing unit 5 no later than the start of the earliest triggering interval, since these patterns of course contain future control pulses 2, so that said computing unit can undertake corresponding corrections. The control pulse patterns $S_1$, $S_2$, $S_3$ are calculated with no overlap by the first computing unit 4 and made available to the second computing unit 5.

It can be seen in FIG. 5b that the control pulse patterns $S_1$, $S_2$, $S_3$ calculated by the computing unit 4 on the basis of the prior state data $Z_{E,old}$ of the engine 6 cover future time periods that are of different lengths. In the present case, the ascertained rate of change of interesting state data $Z_E$ of the engine 6 enters into the decision of how far control pulse patterns S with future triggering information are calculated.

Lastly, FIG. 5c illustrates that the control pulse patterns $S_1$, $S_2$, $S_3$ are calculated by the first computing unit 4 in such a way that overlapping control pulse patterns $S_1$, $S_2$, $S_3$ are produced. For example, once the control pulse pattern $S_2$ has been calculated by the first computing unit 4 and made available to the computing unit 5, the computing unit 5 discards the control pulse pattern $S_1$ and performs further correction of the triggering information on the basis of the triggering information contained in the control pulse pattern $S_2$. It is especially clearly evident in this example that the calculations performed on the first computing unit 4 and the second computing unit 5 are decoupled from one another and the first computing unit 4 and the second computing unit 5 can work asynchronously from one another.

In the case of the control unit 3 from FIG. 2, the first computing unit 4 is implemented using a microcontroller, and the second computing unit 5 is implemented using a programmable logic element, in the present case using a field programmable gate array (FPGA). As a result, it is possible for the second computing unit 5 to realize sampling times significantly under the microsecond range, by which means even cylinder pressure curves, for example, can be evaluated in real time and utilized for closed-loop control within a feed-forward cycle.

The second computing unit 5 uses the current crankshaft angle and the prevailing current cylinder pressure as the current state data $Z_{E,new}$ of the engine 6.

The first computing unit 4, in contrast, uses the last known crankshaft angle, the last known value for the air mass flow, and the last known value for the combustion air ratio, as the prior state data $Z_{E,old}$ of the engine 6.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer-implemented method for calculating and outputting control pulses by a control unit that has a first computing unit and a second computing unit, the control pulses being outputted by the control unit to an internal combustion engine, the method comprising:
   calculating, via the first computing unit using prior state data of the engine, a control pulse pattern with triggering information for multiple future control pulses at a first sampling rate;
   transmitting, via the first computing unit, the calculated control pulse pattern to the second computing unit;
   correcting the triggering information of the control pulses that are currently to be output using current state data of the engine via the second computing unit at a second sampling rate that is greater than the first sampling rate of the first computing unit;
   outputting the control pulses to the engine via the control unit based on the corrected triggering information; and
   control the engine using the corrected triggering information,
   wherein the first computing unit is implemented using at least one processor or microcontroller, and wherein the second computing unit is implemented using at least one programmable logic element or a field programmable gate array.

2. The computer-implemented method according to claim 1, wherein the second computing unit checks whether a control pulse having corrected triggering information conflicts with a subsequent control pulse, and wherein overlaps of triggering intervals defined by the triggering information of consecutive control pulses are detected.

3. The computer-implemented method according to claim 2, wherein control pulses having conflicting triggering information are combined into a single control pulse with averaged triggering information or all but one of the conflicting control pulses are discarded.

4. The computer-implemented method according to claim 1, wherein the control pulses are at least one of pulses for controlling the fuel injection or pulses for controlling the ignition of the injected fuel.

5. The computer-implemented method according to claim 1, wherein the second computing unit uses at least one of a current crankshaft angle, a time derivative of a current crankshaft angle, a current cylinder pressure, or a time derivative of the cylinder pressure, as current state data of the engine.

6. The computer-implemented method according to claim 1, wherein the first computing unit uses at least one of a last known crankshaft angle, a last known value for an air mass flow, a last known value for an injected fuel quantity, a last known value for a combustion air ratio, or a time derivative of the aforementioned variables as prior state data of the engine.

7. The computer-implemented method according to claim 1, wherein the first computing unit calculates, with no time limitations, control pulse patterns that are calculated using the prior state data so that even overlapping control pulse patterns are generated and transmitted to the second computing unit, and wherein the second computing unit uses the most current control pulse pattern received.

8. A control unit for calculating and outputting control pulses to an internal combustion engine, the control unit comprising:
a first computing unit; and
a second computing unit,
wherein the first computing unit is implemented using at least one processor or microcontroller, and wherein the second computing unit is implemented using at least one programmable logic element or a field programmable gate array,
wherein, in an operating state of the control unit, the first computing unit calculates a control pulse pattern with triggering information for multiple future control pulses at a first sampling rate using prior state data of the engine and transmits the calculated control pulse pattern to the second computing unit,
wherein, in the operating state of the control unit, the second computing unit, at a second sampling rate that is greater than the first sampling rate of the first computing unit, corrects the triggering information of the control pulses that are currently to be output using current state data of the engine, and
wherein the control pulses are output to the engine by the control unit based on the corrected triggering information so as to control the engine using the corrected triggering information.

9. The control unit according to claim 8, wherein the first computing unit and the second computing unit are configured by programming.

* * * * *